(12) United States Patent
Gore et al.

(10) Patent No.: US 7,336,719 B2
(45) Date of Patent: Feb. 26, 2008

(54) SYSTEM AND METHOD FOR TRANSMIT DIVERSITY BASE UPON TRANSMISSION CHANNEL DELAY SPREAD

(75) Inventors: Dhananjay Gore, Stanford, CA (US); Sumeet Sandhu, Mountain View, CA (US); Shilpa Talwar, Palo Alto, CA (US); Arogyaswami J. Paulraj, Stanford, CA (US)

(73) Assignee: Intel Corporation, Santa Clara, CA (US)

(*) Notice: Subject to any disclaimer, the term of this patent is extended or adjusted under 35 U.S.C. 154(b) by 482 days.

(21) Appl. No.: 09/999,438

(22) Filed: Nov. 28, 2001

(65) Prior Publication Data

US 2003/0099304 A1    May 29, 2003

(51) Int. Cl.
  *H04B 7/02*    (2006.01)
(52) U.S. Cl. ..................................... 375/267
(58) Field of Classification Search .............. 375/130, 375/140, 146, 147, 148, 259, 260, 267; 455/562.1, 455/561, 550.1, 73; 370/208, 203
See application file for complete search history.

(56) References Cited

U.S. PATENT DOCUMENTS

| 4,347,627 A | 8/1982 | Alter |
| 4,554,552 A | 11/1985 | Alford et al. |
| 5,136,528 A | 8/1992 | Fordham et al. |
| 5,345,599 A | 9/1994 | Paulraj et al. |
| 5,361,276 A | 11/1994 | Subrumanian |
| 5,504,936 A | 4/1996 | Lee |
| 5,515,378 A | 5/1996 | Roy et al. |

(Continued)

FOREIGN PATENT DOCUMENTS

EP    1 185 001    3/2002

(Continued)

OTHER PUBLICATIONS

Sumeet Sandhu, A Paulraj, Oct. 6, 2000, Wireless Conference Presented Paper, Union Bound for linear Space-Time Codes.

(Continued)

*Primary Examiner*—Pankaj Kumar
(74) *Attorney, Agent, or Firm*—James S. Finn; Intel Corporation

(57) ABSTRACT

The present invention provides a diversity transmission system. The diversity transmission system includes a method and system of diversity transmission through a wireless channel formed between multiple transmission antennae of a transceiver and a subscriber unit. The method includes forming a stream of symbols from an incoming data stream. A plurality of the symbols are selected forming a data vector. A maximum delay spread through the wireless channel is determined. The maximum delay spread is generally determined as a multiple of a sample time spacing between elements of the data vector. A plurality of diversity vectors are generated based upon the data vector and the maximum delay spread, each diversity vector includes a plurality of elements. Corresponding elements of the diversity vectors are simultaneously transmitted, each diversity vector transmitted from at least one corresponding antenna of a plurality of spatially separate antennae. This embodiment can further include repeatedly simultaneously transmitting corresponding elements of the diversity vectors until all elements of the diversity vectors have been transmitted, each diversity vector transmitted from at least one corresponding antenna of a plurality of spatially separate antennae.

28 Claims, 9 Drawing Sheets

U.S. PATENT DOCUMENTS

| | | | |
|---|---|---|---|
| 5,535,242 A | 7/1996 | Bridida et al. | |
| 5,559,810 A | 9/1996 | Gilbert et al. | |
| 5,592,471 A | 1/1997 | Briskman | |
| 5,592,490 A | 1/1997 | Barratt et al. | |
| 5,608,765 A | 3/1997 | Tanoue | |
| 5,627,861 A | 5/1997 | Kataoka et al. | |
| 5,642,353 A | 6/1997 | Roy et al. | |
| 5,715,240 A | 2/1998 | Borras et al. | |
| 5,721,733 A | 2/1998 | Wang et al. | |
| 5,729,825 A | 3/1998 | Kostreski et al. | |
| 5,732,075 A | 3/1998 | Tangemann et al. | |
| 5,752,193 A | 5/1998 | Scholefield et al. | |
| 5,781,583 A | 7/1998 | Bruckert et al. | |
| 5,815,488 A | 9/1998 | Williams et al. | |
| 5,819,168 A | 10/1998 | Golden et al. | |
| 5,828,658 A | 10/1998 | Ottersten et al. | |
| 5,832,044 A | 11/1998 | Sousa et al. | |
| 5,841,971 A | 11/1998 | Longginou et al. | |
| 5,867,478 A | 2/1999 | Baum | |
| 5,886,988 A | 3/1999 | Yun et al. | |
| 5,889,759 A | 3/1999 | McGibney | |
| 5,894,598 A | 4/1999 | Shoki | |
| 5,901,354 A | 5/1999 | Menich et al. | |
| 5,923,650 A | 7/1999 | Chen et al. | |
| 5,933,421 A | 8/1999 | Alamouti et al. | |
| 5,936,949 A | 8/1999 | Pasternak et al. | |
| 5,940,771 A | 8/1999 | Gollnick et al. | |
| 5,999,800 A | 12/1999 | Choi et al. | |
| 6,021,124 A | 2/2000 | Haartsen | |
| 6,049,543 A | 4/2000 | Sauer et al. | |
| 6,058,105 A | 5/2000 | Hochwald et al. | |
| 6,058,114 A | 5/2000 | Sethuram et al. | |
| 6,064,662 A | 5/2000 | Gitlin et al. | |
| 6,067,290 A | 5/2000 | Paulraj et al. | |
| 6,069,883 A | 5/2000 | Ejzak et al. | |
| 6,081,566 A | 6/2000 | Molnar et al. | |
| 6,097,704 A | 8/2000 | Jackson et al. | |
| 6,097,771 A | 8/2000 | Foschini | |
| 6,108,565 A | 8/2000 | Scherzer | |
| 6,144,711 A | 11/2000 | Raleigh et al. | |
| 6,154,661 A | 11/2000 | Goldburg | |
| 6,163,547 A | 12/2000 | De Vriendt et al. | |
| 6,175,550 B1 | 1/2001 | Van Nee | |
| 6,185,258 B1 | 2/2001 | Alamouti | |
| 6,185,440 B1 * | 2/2001 | Barratt et al. ............. | 455/562.1 |
| 6,192,026 B1 | 2/2001 | Pollack et al. | |
| 6,198,775 B1 | 3/2001 | Khayrallah et al. | |
| 6,243,367 B1 | 6/2001 | Hussain | |
| 6,249,669 B1 | 6/2001 | Ogino et al. | |
| 6,266,527 B1 | 7/2001 | Mintz | |
| 6,278,697 B1 | 8/2001 | Brody et al. | |
| 6,317,420 B1 | 11/2001 | Schiff | |
| 6,317,435 B1 | 11/2001 | Tiedemann | |
| 6,317,466 B1 | 11/2001 | Foschini et al. | |
| 6,351,499 B1 | 2/2002 | Paulraj et al. | |
| 6,370,129 B1 | 4/2002 | Huang | |
| 6,400,699 B1 | 6/2002 | Airy et al. | |
| 6,411,824 B1 | 6/2002 | Eidson | |
| 6,441,721 B1 | 8/2002 | Tajima et al. | |
| 6,452,981 B1 | 9/2002 | Raleigh et al. | |
| 6,473,399 B1 | 10/2002 | Johansson et al. | |
| 6,473,467 B1 | 10/2002 | Wallace | |
| 6,490,256 B1 | 12/2002 | Jones et al. | |
| 6,507,605 B1 | 1/2003 | Fukumoto et al. | |
| 6,535,497 B1 | 3/2003 | Raith | |
| 6,563,790 B1 | 5/2003 | Yu et al. | |
| 6,583,400 B2 | 6/2003 | Miyoshi | |
| 6,650,878 B1 | 11/2003 | Abe et al. | |
| 6,714,514 B1 | 3/2004 | Espax et al. | |
| 6,757,241 B1 | 6/2004 | Jones et al. | |
| 6,763,491 B2 | 7/2004 | McDonnell | |
| 6,778,501 B1 | 8/2004 | Malmgren et al. | |
| 6,802,035 B2 | 10/2004 | Catreux et al. | |
| 6,842,487 B1 * | 1/2005 | Larsson ..................... | 375/260 |
| 6,850,481 B2 * | 2/2005 | Wu et al. .................. | 370/208 |
| 6,888,809 B1 | 5/2005 | Foschini et al. | |
| 2001/0003088 A1 | 6/2001 | Ogino et al. | |
| 2002/0000948 A1 | 1/2002 | Chun et al. | |
| 2002/0071407 A1 | 6/2002 | Koo et al. | |
| 2002/0097684 A1 | 7/2002 | Das et al. | |
| 2003/0035490 A1 | 2/2003 | Gollamudi | |
| 2003/0147353 A1 | 8/2003 | Clarkson et al. | |

FOREIGN PATENT DOCUMENTS

| | | |
|---|---|---|
| WO | WO 96/22662 | 7/1996 |
| WO | WO 98/34424 | 8/1996 |
| WO | WO 98/09381 | 3/1998 |
| WO | WO 98/09385 | 3/1998 |
| WO | WO 00/79722 | 12/2000 |

OTHER PUBLICATIONS

Paulraj, A. et al., "Space-Time Processing for Wireless Communications", IEEE Signal Processing Magazine, Nov. 1997, pp. 49-83.

Paulraj, A., "Taxonomy of Space-Time Processing for Wireless Networks", IEEE Proc.—Radar Sonar Navig., vol. 145, No. 1 Feb. 1998.

Andrews, M. et al., "Tripping the Capacity of Wireless Communications using Electromagnetic Polarization", Nature Magazine, Jan. 18, 2001, pp. 316-318, vol. 409, Macmillian Magazine.

Bertoni, Henry L., "Talk is cheap in the City", Nature Magazine, Jan. 18, 2001, pp. 291-292, vol. 409, Macmillian Magazines.

Sumeet Sanhu and A. Paulraj, Oct. 6, 2000, Wireless Conference Presented Paper.

Raliegh et al., "Spatio-Temporal Coding for Wireless Communication", Mar. 1998, IEEE Transactions on Communications.

A. Maleki et al., "Space-Time Coding Transmission Optimization for Wireless Channels" Jul. 1998, IEEE.

A. Scaglione et al., "Filterbank Transceivers Optimization Information Rate in Block Transmission over Drepssive Channnels", Apr. 1999, IEEE.

A. Scaglione et al., Redundant Filterbank Precoders and Equalizers Part 1: Unification and Optimal Designs, Jul. 1999 Transactions on Signal Processing.

R. Negi et al., Adaptive Antennas for Space-Time Coding over Block-Time Invariant Multi-Path Fading Channels, 1999, IEEE.

D. Shiu et al., Fading Correlation and Its Effects on the Capacity of the Multielement Antenna Systems, IEEE Transactions on Communications, vol. 48, No. 3, Mar. 2000.

H. Bolcskei et al., Performance of Space-Time Codes in the Presence of Spatial Fading Correlation, IEEE, 2000.

H. Sampath et al. Generalized Linear Precoder and Decoder Desgin for MIMO Channels using the Weighted MMSE Criterion, IEEE Transactions on Communications, vol. XX, No. Y, 2001.

* cited by examiner

SYSTEM AND METHOD FOR TRANSMIT DIVERSITY BASE UPON TRANSMISSION CHANNEL DELAY SPREAD

FIELD OF THE INVENTION

The invention relates generally to wireless communications. More particularly, the invention relates to a system and method of transmit diversity that is dependent upon transmission channel delay spread.

BACKGROUND OF THE INVENTION

Wireless communication systems commonly include information-carrying modulated carrier signals that are wirelessly transmitted from a transmission source (for example, a base transceiver station) to one or more receivers (for example, subscriber units) within an area or region.

A form of wireless communication includes multiple transmit antennae and multiple receiver antennae. Multiple antennae communication systems can support communication diversity and spatial multiplexing.

FIG. 1 shows three transmitter antenna arrays 110, 120, 130 that transmit data symbols to a receiver antenna array 140. Each transmitter antenna array and each receiver antenna array include spatially separate antennae. A receiver connected to the receiver antenna array 140 separates the received signals.

FIG. 2 shows modulated carrier signals traveling from a transmitter 210 to a receiver 220 following many different (multiple) transmission paths.

Multipath can include a composition of a primary signal plus duplicate or echoed images caused by reflections of signals off objects between the transmitter and receiver. The receiver may receive the primary signal sent by the transmitter, but also receives secondary signals that are reflected off objects located in the signal path. The reflected signals arrive at the receiver later than the primary signal. Due to this misalignment, the multipath signals can cause intersymbol interference or distortion of the received signal.

The actual received signal can include a combination of a primary and several reflected signals. Because the distance traveled by the original signal is shorter than the reflected signals, the signals are received at different times. The time difference between the first received and the last received signal is called the delay spread and can be as great as several micro-seconds.

The multiple paths traveled by the modulated carrier signal typically results in fading of the modulated carrier signal. Fading causes the modulated carrier signal to attenuate in amplitude when multiple paths subtractively combine.

Antenna diversity is a technique used in multiple antenna-based communication system to reduce the effects of multi-path fading. Antenna diversity can be obtained by providing a transmitter and/or a receiver with two or more antennae. These multiple antennae imply multiple channels that suffer from fading in a statistically independent manner. Therefore, when one channel is fading due to the destructive effects of multi-path interference, another of the channels is unlikely to be suffering from fading simultaneously. By virtue of the redundancy provided by these independent channels, a receiver can often reduce the detrimental effects of fading.

Prior art wireless transmitter diversity systems provide some mitigation of the effects of fading. However, the delay spread of the transmission channel can degrade the performance of transmission diversity systems. Additionally, the delay spread can change over time, resulting in even greater degradation in the performance of the transmitter diversity system.

It is desirable to have a method and system that provides a multiple antennae diversity transmitter system for wirelessly transmitting information to a subscriber that accounts for the maximum delay spread of a transmission channel between the transmitter antennae and the subscriber unit. Additionally, it is desirable that the method and system be able to dynamically adapt to variations in the maximum delay spread. It is desirable that the transmitter diversity system include a simple receiver design.

SUMMARY OF THE INVENTION

The invention includes a method and system for a multiple transmission antennae diversity transmitter that accounts for transmission channel delay spread. The method and system can dynamically adapt to a maximal delay spread that varies over time. The corresponding receiver design is simple and easy to implement.

A first embodiment of the invention includes a method of diversity transmission through a wireless channel formed between multiple transmission antennae of a transceiver and a subscriber unit. The method includes forming a stream of symbols from an incoming data stream. A plurality of the symbols are selected forming a data vector. A maximum delay spread through the wireless channel is determined. The maximum delay spread is generally determined as a multiple of a sample time spacing between elements of the data vector. A plurality of diversity vectors are generated based upon the data vector and the maximum delay spread, each diversity vector includes a plurality of elements. Corresponding elements of the diversity vectors are simultaneously transmitted, each diversity vector transmitted from at least one corresponding antenna of a plurality of spatially separate antennae. This embodiment can further include repeatedly simultaneously transmitting corresponding elements of the diversity vectors until all elements of the diversity vectors have been transmitted, each diversity vector transmitted from at least one corresponding antenna of a plurality of spatially separate antenna.

Another embodiment of the invention further includes generating the plurality of diversity vectors based upon the data vector and the maximum delay spread by generating each diversity vector by shifting elements within the data vector by an amount that corresponds with a multiple of the maximum delay spread. Another embodiment includes generating each diversity vector by shifting elements within the data vector by an amount that corresponds with a multiple of a delay greater than the maximum delay spread. Another embodiment includes generating an Mth diversity vector by shifting elements within the data vector by $(M-1)*L$, where L is the maximum delay spread normalized by a sample time spacing between elements of the data vector. Another embodiment includes the diversity vectors being formed from the data vector by circularly shifting the elements of the data vector. A cyclic prefix can be appended to each of the diversity vectors.

For another embodiment, simultaneously transmitting corresponding elements of the diversity vectors includes simultaneously transmitting all the elements of the diversity vectors, each element transmitted within a corresponding frequency slot. Each frequency slot can include at least one multiple carrier signal. The multiple carrier signals can be orthogonal frequency division mutiplexed (OFDM) signals.

Another embodiment includes the selected input symbols including at least $M_t*L$ symbols, where L is the maximum delay spread normalized by a sample time spacing between elements of the data vector, and the transmitter comprises $M_t$ spatially separate transmit antennae. $M_t*L$ can be a power of two.

An embodiment includes the spatially separate antennae being co-located at a single base transceiver station. Another embodiment includes the spatially separate antennae being located at a plurality of base transceiver stations.

An embodiment includes the maximum delay spread being determined by characterizing the wireless channel. Another embodiment includes the maximum delay spread being determined by the subscriber unit, and the maximum delay spread being fed back to the transceiver. Another embodiment includes the maximum delay spread being determined by the transceiver receiving and characterizing signals received from the subscriber unit.

Other aspects and advantages of the present invention will become apparent from the following detailed description, taken in conjunction with the accompanying drawings, illustrating by way of example the principles of the invention.

DETAILED DESCRIPTION

Figure 1:
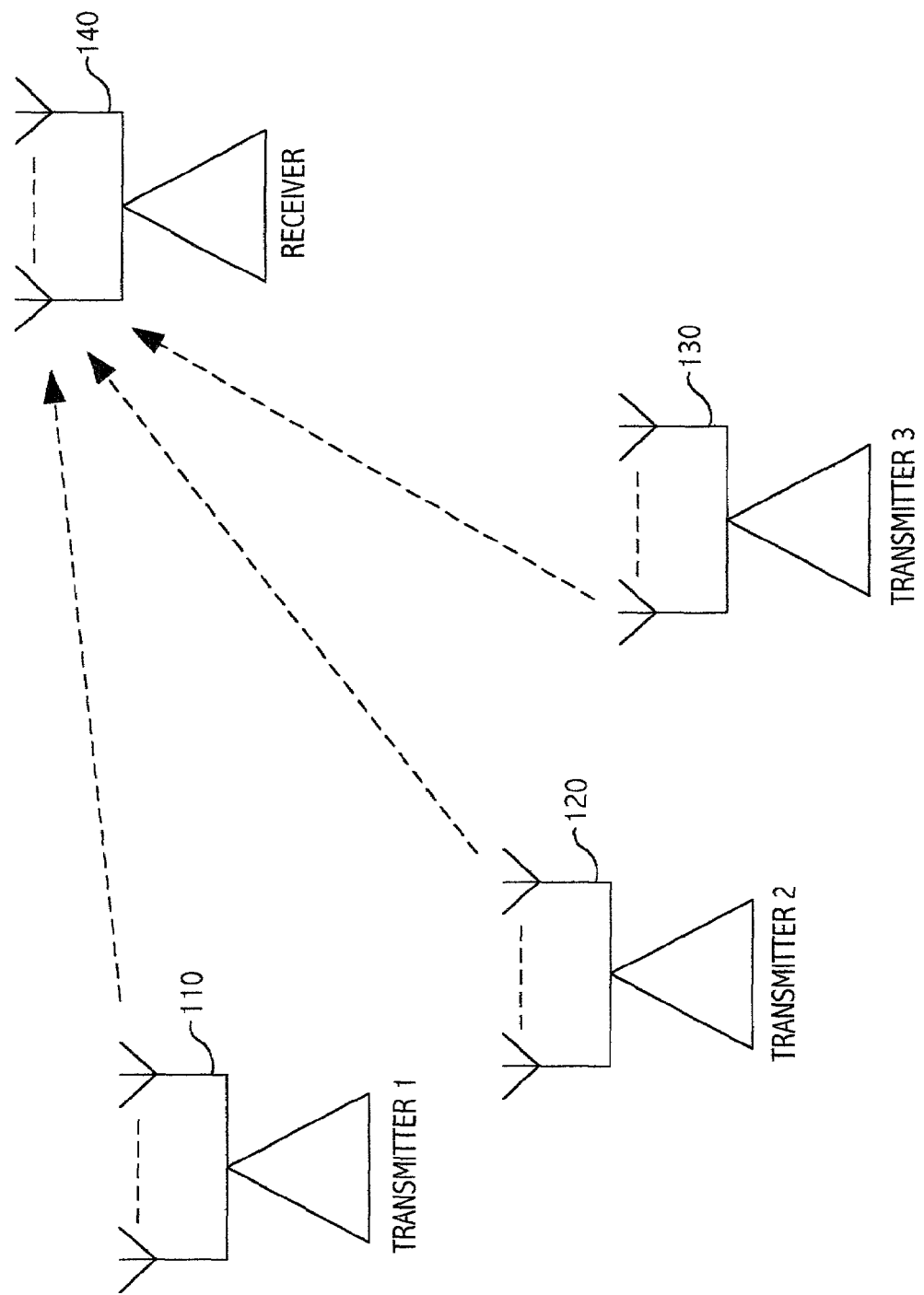
FIG. 1 shows a prior art wireless system that includes spatially separate transmitter antennae and spatially separate receiver antennae.
Figure 2:
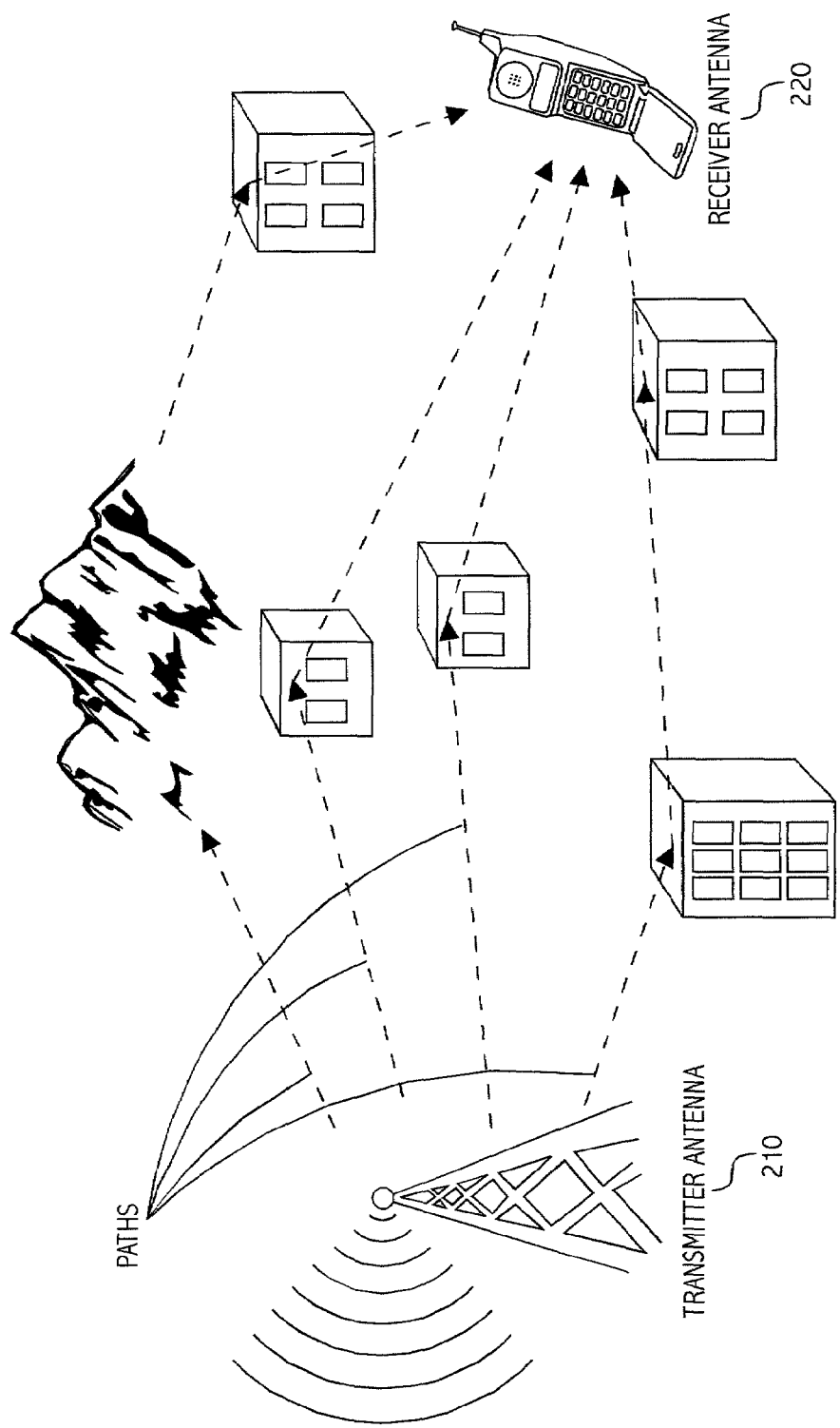
FIG. 2 shows a prior art wireless system that includes multiple paths from a system transmitter to a system receiver.

As shown in the drawings for purposes of illustration, the invention is embodied in a method and system for a multiple transmission antennae diversity transmitter that accounts for transmission channel delay spread. The method and system can dynamically adapt to a maximal delay spread that varies over time. The corresponding receiver design is simple and easy to implement.

Particular embodiments of the present invention will now be described in detail with reference to the drawing figures. The techniques of the present invention may be implemented in various different types of wireless communication systems. Of particular relevance are cellular wireless communication systems. A base station transmits downlink signals over wireless channels to multiple subscribers. In addition, the subscribers transmit uplink signals over the wireless channels to the base station. Thus, for downlink communication the base station is a transmitter and the subscribers are receivers, while for uplink communication the base station is a receiver and the subscribers are transmitters. The subscribers may be mobile or fixed. Exemplary subscribers include devices such as portable telephones, car phones, and stationary receivers such as a wireless modem at a fixed location.

The base station is provided with multiple antennas that allow antenna diversity techniques and/or spatial multiplexing techniques. In addition, each subscriber can be equipped with multiple antennas that also permit spatial multiplexing and/or antenna diversity. Although the techniques of the present invention apply to point-to-multipoint systems, they are not limited to such systems, but apply to any wireless communication system having at least two devices in wireless communication. Accordingly, for simplicity, the following description will focus on the invention as applied to a single transmitter-receiver pair, even though it is understood that it applies to systems with any number of such pairs.

Typically, variations of the wireless channels cause uplink and downlink signals to experience fluctuating levels of attenuation, interference, multi-path fading and other deleterious effects. In addition, the presence of multiple signal paths (due to reflections off buildings and other obstacles in the propagation environment) cause variations of channel response over the frequency bandwidth, and these variations may change with time as well. As a result, there are temporal changes in channel communication parameters such as data capacity, spectral efficiency, throughput, and signal quality parameters, e.g., signal-to-interference and noise ratio (SINR), and signal-to-noise ratio (SNR). The circulant diversity communication system of the invention mitigates the effects of multipath.

Information is transmitted over the wireless channel using one of various possible transmission modes. For the purposes of the present application, a transmission mode is defined to be a particular modulation type and rate, a particular code type and rate, and may also include other controlled aspects of transmission such as the use of antenna diversity or spatial multiplexing. Using a particular transmission mode, data intended for communication over the wireless channel is coded, modulated, and transmitted. Examples of typical coding modes are convolution and block codes, and more particularly, codes known in the art such as Hamming Codes, Cyclic Codes and Reed-Solomon Codes. Examples of typical modulation modes are circular constellations such as BPSK, QPSK, and other m-ary PSK, square constellations such as 4QAM, 16QAM, and other m-ary QAM. Additional popular modulation techniques include GMSK and m-ary FSK. The implementation and use of these various transmission modes in communication systems is well known in the art.

Figure 3:
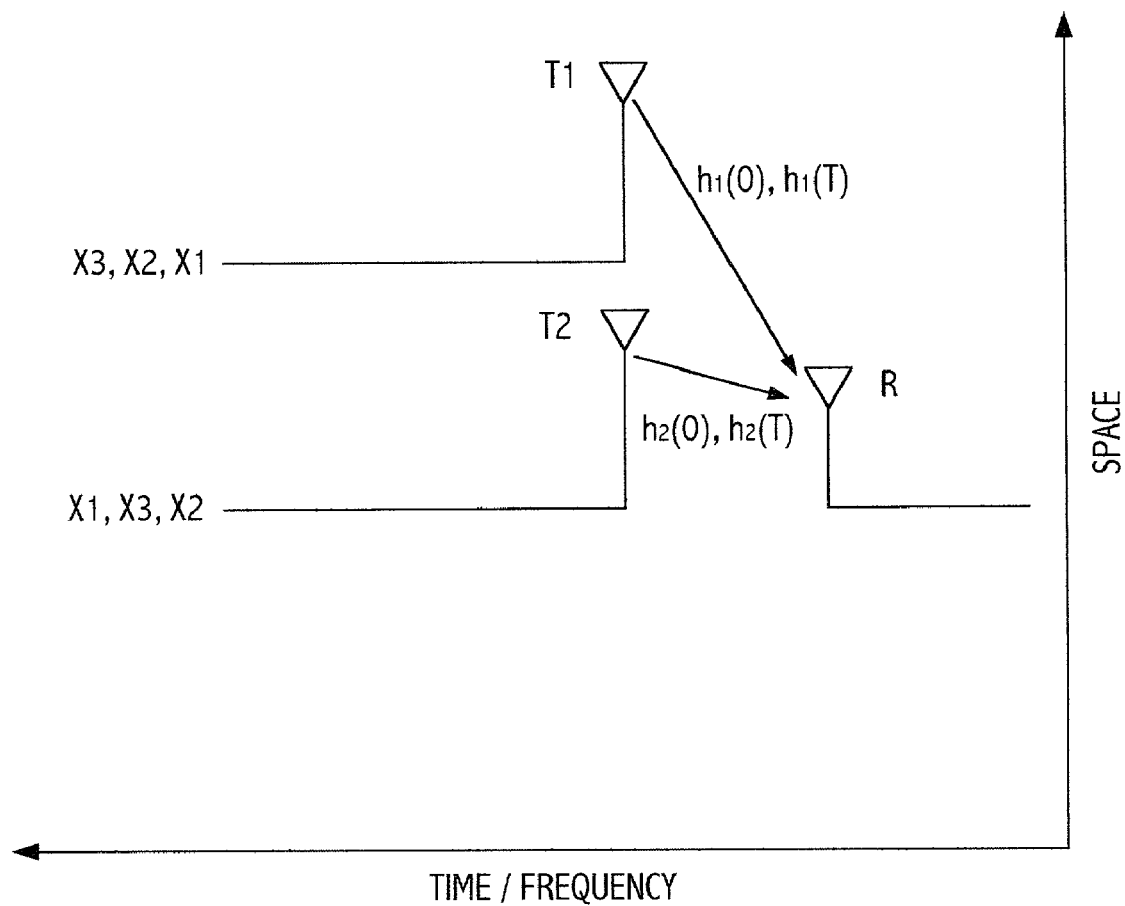
FIG. 3 shows an embodiment of the invention.

FIG. 3 shows an embodiment of the invention. This embodiment includes two diversity vectors [X1, X2, X3, X4], [X3, X4, X1, X2] being transmitted from two spatially separate antennae T1, T2. The transmitted diversity vectors are received by a receiver R after traveling through transmission channels h1, h2.

In FIG. 3, the transmission channels h1, h2 are depicted by [h1(0), h1(T)] and [h2(0), h1(T)]. The multiple transmission channel designators represent multiple transmission channel paths due to the delay spread corresponding to the diversity vectors as will be described later. The diversity vectors are generated based upon the maximum delay spread. The maximum delay spread can be used to generate multiple transmission channel designators.

Formation of the Diversity Vectors

The formation of the diversity vectors begins by obtaining a stream of data bits that are to be transmitted. The data stream is generally encoded. The encoding can include a standard coding and interleaving scheme. Additionally, the coding can be optimized for particular channel characteristics.

The encoded stream is mapped into symbols (typically N-QAM). A block of N symbols are selected forming a data vector. An embodiment includes the number N of symbols selected being greater or equal to the number of transmit antennae $M_t$ multiplied by the maximum delay spread L. The maximum delay spread L is normalized by the sample time period between symbols.

Each element within the data vector is then delayed by a multiple of the maximum delay spread L to form more than one diversity vector. An embodiment includes generating the Mth diversity vector by shifting elements within the data vector by (M−1)*L. For example, for a data vector of [X1, X2, X3, X4], and a maximum delay spread of 2, corresponding diversity vectors include [X1, X2, X3, X4] and [X3, X4, X1, X2]. The first diversity vector [X1, X2, X3, X4] is the data vector in which the elements within the data vector are shifted by (1−1)*2=0. The second diversity vector [X3, X4, X1, X2] is the data vector in which the elements within the data vector are shifted by (2−1)*2=2. Note that the above-described diversity vectors include a circular shift of the elements of the data vector.

Mirror images of the above-listed transmit vectors can also be used. For example, the possible diversity vectors can be [X4, X3, X2, X1] and [X2, X1, X4, X3].

Other embodiments include alternate methods of shifting the elements within the data vector. For example, the first diversity vector can be [X1, X2, X3, X4] while the second diversity vector can be [X−1, X0, X1, X2] where X-1 and X0 represent the symbols that occur prior to X1 and X2. Another embodiment includes the second diversity vector being [0, 0, X1, X2]. The essential element is that the diversity vectors are based upon the data vector in which the elements of the data vector are shifted depending upon the maximum delay spread L. The value of L can be equal or greater than the estimated maximum delay spread.

Generally, the Mth diversity vector is transmitted from an Mth transmission antenna. However, the number of diversity vectors does not have to exactly match the number of transmission antennae. M can be selected for optimal transmission.

Generally, the block size (that is, the number of elements) of the data vector is selected to be greater or equal to M*L. As mentioned above, M can be selected. L is measured or estimated, and is dependent upon transmission characteristics of the transmission channel. As previously mentioned, L is the maximum delay spread normalized by the sampling period between symbols of the data vector.

As described earlier, each diversity vector is transmitted from a spatially separate antenna. There are two diversity vectors of FIG. 3, which corresponds to the number of transmit antennae. However, as previously described, the number of selected symbols, and therefore, the number of elements within the diversity vectors is generally greater or equal to the number of transmit antennae $M_t$ multiplied by the maximum delay spread L.

Determination of the Maximum Delay Spread

There are several different methods for determining the maximum delay spread L. The maximum delay spread can be determined by pre-characterizing the delay spread through the transmission channel. A limitation of this method is that it is more difficult to update the maximum delay spread on-the-fly. That is, generally, a maximum delay spread measurement or characterization is made, and then infrequently updated. Methods of making maximum delay spread measurements of a transmission channel are well known in the art of communication systems.

Alternate embodiments include the maximum delay spread being monitored by either the transceiver or the subscriber unit. These embodiments allow for the diversity transmission to adapt to a transmission channel in which the maximal delay spread varies over time. As a result, the transmission diversity can be continually optimized.

As is know in the prior art, the subscriber unit can determine the maximum delay spread L. This can be accomplished by the subscriber unit receiving signals having predetermined characteristics, in either the time domain or the frequency domain. The subscriber unit can then transmit the estimated maximum delay spread L back to the transceiver.

In a TDD system, the transceiver can estimate or determine the maximum delay spread. This can be accomplished by the transceiver receiving signals having predetermined characteristics, in either the time domain or the frequency domain.

Delay Spread Determination in the Frequency Domain

Wireless transmission of multiple carrier signals (such as OFDM signals as described later) can include the transmission of training tones. The training tones can be used to estimate or characterize the transmission channel at the frequencies of the tones. Estimated training of additional tones can be obtained by interpolating between the characterized tones. A frequency domain representation of the transmission channel can be obtained from the estimated (directly estimated and interpolated) training tones. A time domain channel estimation can be acquired by performing an IFFT (inverse fast fourier transform) on the frequency domain representation of the transmission channel. The time spread of the time domain channel estimation can be used to estimate the maximum delay spread of the transmission channel. Generally, this includes using a predetermined threshold to detect the time domain estimation yielding a maximum time delayed response and a minimum time delayed response. The delay spread is the difference between the maximum time delayed response and the minimum time delay response. As previously stated, the frequency domain analysis can be performed at either the transceiver or the subscriber unit depending on whether the transmission system is TDD or FDD.

Delay Spread Determination in the Time Domain

A predetermined sequence of training symbols can be transmitted through the transmission channel. The predetermined sequence can include desirable auto-correlation properties. The received sequence of training symbols can be correlated with a version of the predetermined sequence of training symbols that is stored at the receiver. The correlated response can be detected with a predetermined threshold to determine the minimum and maximum time delay responses. The maximum delay spread is the difference between the minimum and maximum time delay responses.

The Receiver Configuration

As shown in FIG. 3, the receiver R receives the transmit diversity vectors after the transmit diversity vectors have traveled through transmission channels h1, h2. The receiver forms a block of received symbols. An embodiment includes the block size being greater or equal to the maximum time delay L multiplied by the number of transmitter antennae. The received signals at the receiver can be represented by:

$$y=hX+n.$$

in which y is the vector of received symbols, h represents the channel vector, X is the matrix of transmitted symbols, and n is the vector of additive noise.

The receiver can be implemented as a maximum likelihood (ML) receiver. Assuming that the noise n is white Gaussian, the ML receiver minimizes:

$$\hat{X} = \arg\min \|y - hX\|^2$$

$$X \in QAM$$

where $\hat{X}$ is the maximum likelihood receiver estimate of the corresponding transmitted symbols.

The channel vector h can be defined as:

$$h = [h_{1,1} \ldots h_{1,MT} : \ldots : h_{MR,1} \ldots h_{MR,MT}].$$

Each element of h is a vector that defines the channel between each transmit antenna and each receive antenna. Each element of the channel vector h is a vector defined as:

$$h_{r,t} = [h_{r,t}^{L-1} h_{r,t}^{L-2} \ldots h_{r,t}^0].$$

That is, each $h_{r,t}$ is a 1×L vector in which each element defines one of multiple delayed paths through the transmission channel.

The elements within the channel vector can be determined through channel training as is well known in the art of communications.

The variable X represents the transmitted vectors. X is defined as:

$$X = \begin{bmatrix} S & 0 & \cdots & 0 \\ 0 & S & \cdots & \vdots \\ \vdots & \vdots & S & 0 \\ 0 & \cdots & 0 & S \end{bmatrix}$$

X being a block-diagonal matrix wherein the number of blocks on the diagonal is equivalent to the number of receive antennas.

Further, S is defined as:

$$S = \begin{bmatrix} S_1 \\ \cdots \\ \vdots \\ \cdots \\ S_{MT} \end{bmatrix}$$

Each of the elements within S is a matrix as defined by:

$$S_i = \begin{bmatrix} s_{1,t} & s_{2,t} & \cdots & s_{N,t} \\ s_{2,t} & s_{3,t} & \cdots & s_{N+1,t} \\ \vdots & \vdots & \vdots & \vdots \\ s_{L,t} & s_{L+1,t} & \cdots & s_{N+L-1,t} \end{bmatrix}$$

Each element within $S_t$ is a transmit symbol. Each matrix within S has the dimension of L×N.

Multi-Carrier Systems

An embodiment of the invention include multi-carrier, or more specifically, orthogonal frequency division multiplexed (OFDM) modulation systems.

Again, the encoded stream is mapped into symbols (typically N-QAM). A block of N symbols are selected. The block of symbols s is then multiplied by a discrete-fourier-transform (DFT) matrix Q forming a transmit vector x=Qs. If the block includes N symbols, then the matrix Q has dimensions of N×N, and the resulting transmit vector includes N elements. If N is a power of two, then the matrix Q is an FFT matrix, and the matrix multiplication can be carried out efficiently. DFT and FFT matrices are well known in the art of digital signal processing.

Generally, the elements of a Q matrix are defined as:

$$Q_{mn} = (1/\sqrt{N}) e^{-(j2\pi/N)mn}$$

where m represents the rows of the Q matrix and n represents the columns of the Q matrix. As previously described, N represents the number of symbols within the selected block.

The transmit vector is then circularly rotated to form more than one diversity vector. Circular rotation includes rotating the elements within the transmit vector incrementally, wherein a diversity vector is formed by each incrementally rotated element. For example, if a transmit vector includes four elements [X1, X2, X3, X4], then four possible diversity vectors [X4, X1, X2, X3], [X3, X4, X1, X2], [X2, X3, X4, X1], [X1, X2, X3, X4] can be formed. Circular rotation involves rotating the elements within the transmit vector.

Mirror images of the above-listed transmit vectors can also be used. For example, the possible diversity vectors can be [X3, X2, X1, X4], [X2, X1, X4, X3], [X1, X4, X3, X2], [X4, X3, X2, X1]

OFDM Receiver

A multiple carrier system, such as OFDM, can include another receiver implementation. This implementation is for circular diversity transmission.

The previously described equation y=hX+n, can be expressed as $y^T = Hx + n$, where x is the block of transmitted data symbols and H is a circulant matrix.

From FIG. 3, H can easily be deduced for a transmit diversity system with ($M_t = 2$) transmit antennae (note that $M_t$ is two in FIG. 3):

$$H = \begin{bmatrix} h_1 & h_2 & \cdots & h_{Mt} \\ h_{Mt} & h_1 & \cdots & h_{(Mt-1)} \\ \vdots & \vdots & \vdots & \vdots \\ h_2 & h_3 & \cdots & h_1 \end{bmatrix}$$

Each element $h_k$ of the matrix H matrix represents a channel from the transmit antenna k to the receiver.

The H matrix is a circulant matrix in which each row is a circular shift of the previous row. It is well known that a circulant matrix has an eigendecomposition:

$$H = Q\Lambda Q^*$$

where Q is the previously mentioned DFT matrix, and $\Lambda$ is a diagonal matrix of eigenvalues of H. The eigenvalues can be determined as $\lambda_k = q_k^* H q_k$ where $q_k$ is the $k^{th}$ column of matrix Q, and k=1,2, ... N. Additionally, it is well known in the art that the eigenvalues can be computed more efficiently as $\lambda_k = \sqrt{N} q_k^* h$ where h is the first column of matrix H.

The receiver can be implemented as a maximum likelihood (ML) receiver. Assuming that the noise n is white Gaussian, the ML receiver minimizes:

$$\hat{s} = \arg\min \|y^T - Hx\|^2$$

$$x = Qs, s \in QAM$$

which is equivalent to:

$$\hat{s} = \arg \min \|y^T - Q\Lambda Q^*(Qs)\|^2$$

$$s \in QAM$$

which can be further simplified to $$\hat{s} = \arg \min \|Q^* y^T - \Lambda s\|^2$$

$$s \in QAM$$

Therefore, the received data vector can be post-processed to form $r = Q^* y$, and each element of s can be obtained by N independent minimizations:

$$\hat{s}_k = \arg \min \|r_k - \lambda_k s\|^2, \ k=1,2,\ldots,N$$

$$s \in QAM$$

In another embodiment, the minimization over each element of s can be equivalently achieved by first computing $$\bar{s}_k = (1/\lambda_k) r_k, \ k=1,2,\ldots,N$$

and then projecting $\bar{s}_k$ to its closest QAM symbol to obtain $\hat{s}_k$. The signal-to-noise-ratio (SNR) for estimating $\hat{s}_k$ is given by $$SNR_k = |\lambda_k|^2 SNR$$

where SNR is the input SNR defined as the average symbol energy divided by variance of additive white Gaussian noise. This SNR information may be used in the decoding process to give more weight to symbols with high SNR values corresponding to more accurate symbol information and thereby yielding improved decoding performance. For example, if the system uses Viterbi coding, the SNR information is used to weight soft-metrics that are input to the decoder.

Figure 4:
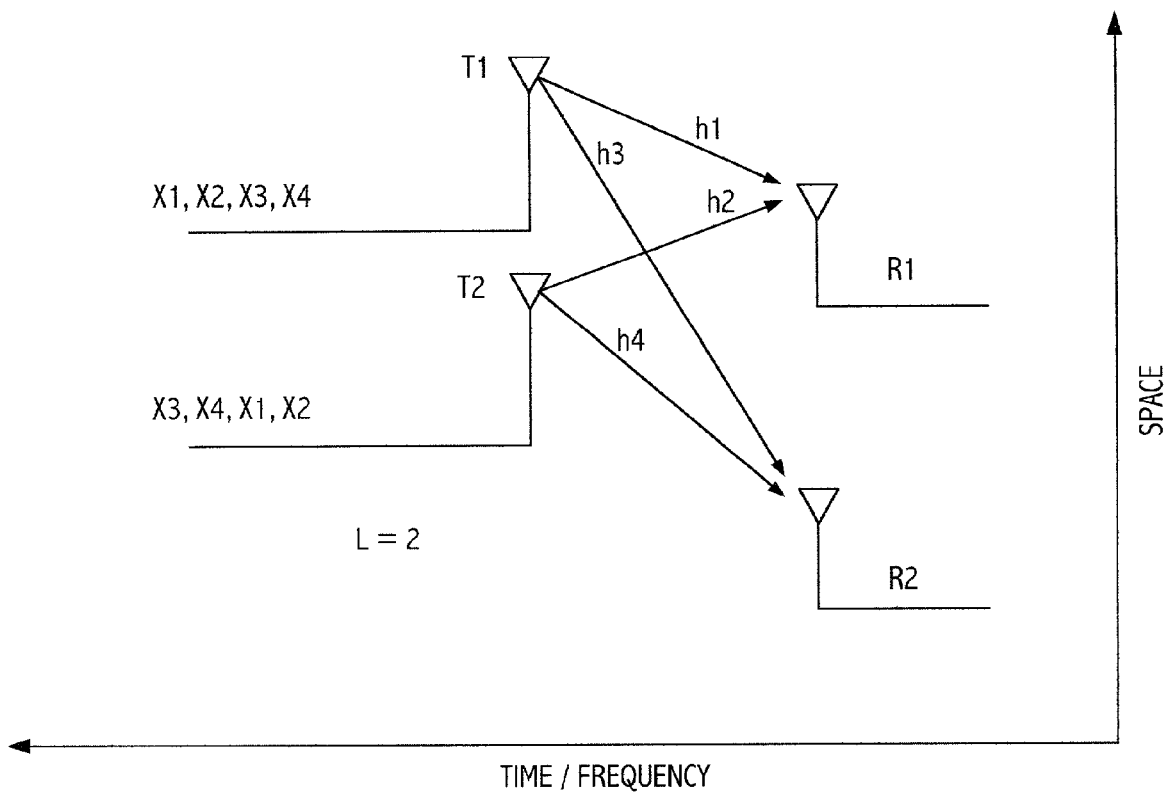
FIG. 4 shows another embodiment of the invention.

FIG. 4 shows another embodiment of the invention. This embodiment includes a first receiver antenna R1 and a second receiver antenna R2. Channels h1, h2 exist between the transmitter antenna T1, T2 and the first receiver antenna R1. Channels h3, h4 exist between the transmitter antennae T1, T2 and the second receiver antenna R2.

A matrix H exists between the transmitter antennae T1, T2 and each of the receiver antennae R1, R2. Therefore, for the embodiment shown in FIG. 4, a matrix H1 exists for the receive antenna R1 and a matrix H2 exists for the receive antenna R2.

The circular diversity ML receiver analysis is similar to before. The joint receiver minimizes $$\hat{s} = \arg \min[\|y_1 - H_1 x\|^2 + \|y_2 - H_2 x\|^2]$$

$$x = Qs, s \in QAM$$

where y1 is the block of of L received symbols at receiver R1 and y2 is the block of of L received symbols at receiver R2. Forming $r_1 = Q^* y_1$ and $r_2 = Q^* y_2$, the above minimization can be simplified to $$\hat{s} = \arg \min[\|r_1 - \Lambda_1 s\|^2 + \|r_2 - \Lambda_2 s\|^2]$$

$$s \in QAM$$

It follows from the fact that $\Lambda_1$ and $\Lambda_2$ are diagonal matrices, that the minimization over the each element of vector s can be carried out independently.

Figure 5:
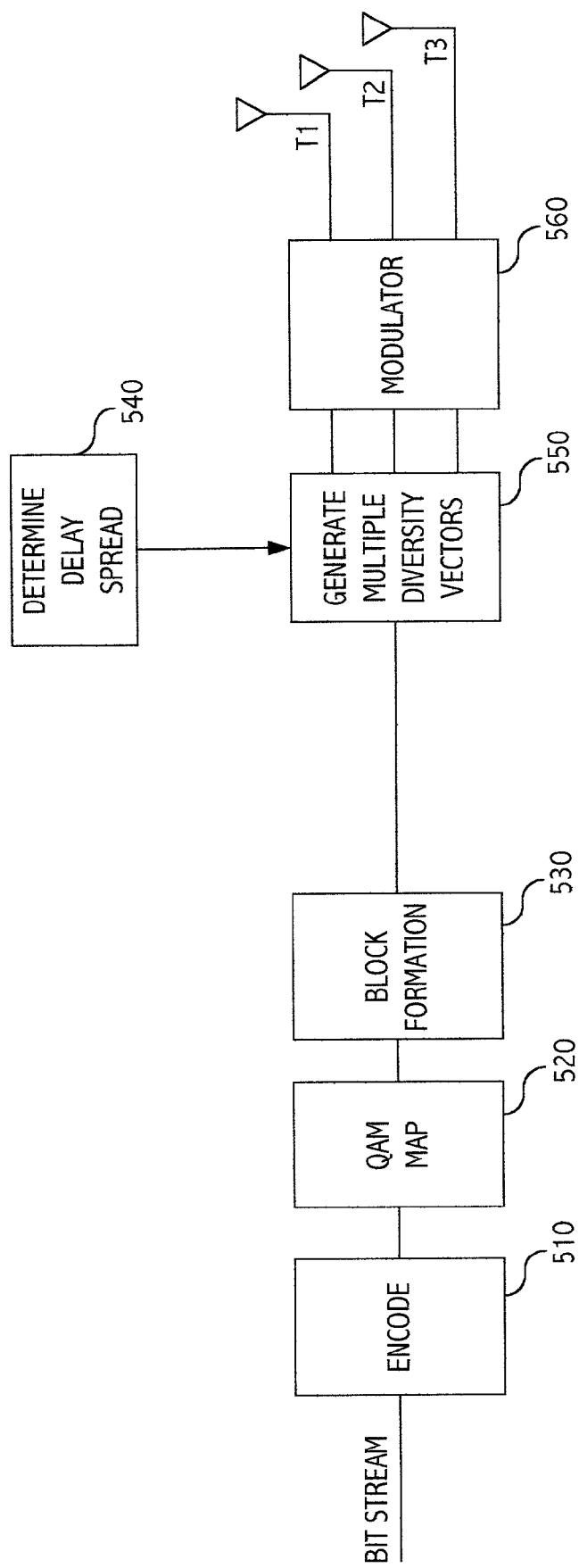
FIG. 5 shows a block diagram of a transmitter according to the invention.

FIG. 5 shows a block diagram of a transmitter according to the invention. As previously described, an encoder 510 receives a bit stream. The encoder encodes the bit stream. The encoding can include convolution and block codes, and more particularly, codes known in the art such as Hamming Codes, Cyclic Codes and Reed-Solomon Codes.

A QAM mapper 520 maps the encoded bit stream into N-QAM symbols. Other typical symbol types can include circular constellations such as BPSK, QPSK, and other m-ary PSK, square constellations such as 4QAM, 16QAM, and other m-ary QAM.

A block former 530 forms blocks that include a predetermined number of symbols. As previously described, the blocks size are typically determined by the number of transmit antennae, but can also be determined by a quality of a channel matrix that represents the transmission channel.

As previously described, the maximum transmission channel delay spread is determined at the transceiver or the subscriber unit. Alternatively, the maximum channel delay spread is characterized independently. Block 540 of FIG. 5 designates the process of determining the maximum channel delay spread.

A diversity vector generator 550 generates diversity vectors based upon the maximum delay spread and the previously formed block of symbols.

An alternate embodiment that include circular transmit diversity includes Q multiplier multiplying the blocks of symbols with a DFT matrix. As previously mentioned, DFT matrices are well known in the art of communication systems. Additionally, circular rotator 550 generates diversity vectors by circularly rotating the output of the Q multiplier 540. Circular rotation includes rotating the elements within the transmit vector incrementally, wherein a diversity vector is formed by each incrementally rotated element.

A modulator 560 modulates carrier signals with the diversity vectors and drives transmit antennae T1, T2, T3. Modulators are well know in the art of communication systems.

Figure 6:
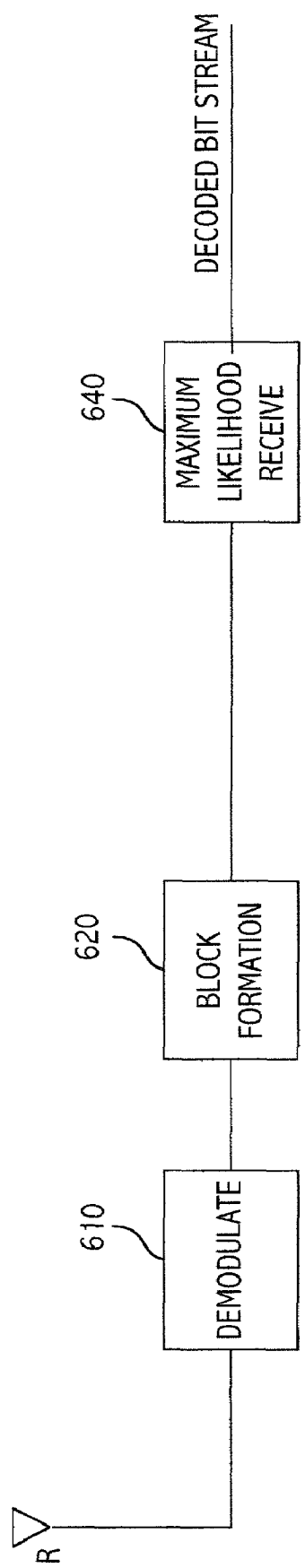
FIG. 6 shows a block diagram of a receiver according to the invention.

FIG. 6 shows a block diagram of a receiver according to the invention. The receiver includes a receiver antenna R, a demodulator 610, a block former 620, a conjugate transpose DFT matrix multiplier 630 and an estimator 640. The estimator 640 of FIG. 6 is shown as a maximum likelihood (ML) receiver.

The receiver antenna receives the previously described transmitted diversity vectors. As was previously described, the receiver can include multiple receive antennae.

The demodulator 610 demodulates the received diversity vectors and generates a stream of received data samples. Demodulators are well known in the art of communication systems.

A block former 620 selects blocks of the received data samples.

The alternate embodiment that includes circular transmit diversity includes a multiplier that multiplies the selected block with a conjugate transpose of the discrete fourier transform matrix. The conjugate transpose of the discrete fourier transform matrix is also known in the art as an IDFT matrix.

A maximum likelihood receiver 640 estimates transmitted symbols from the output of the multiplier. An embodiment includes the maximum likelihood receiver providing more weight to decoding symbols having a high signal to noise (SNR) ratio. Maximum likelihood receivers have been discussed previously.

Orthogonal Frequency Division Multiplexing (OFDM) Modulation

Figure 7:
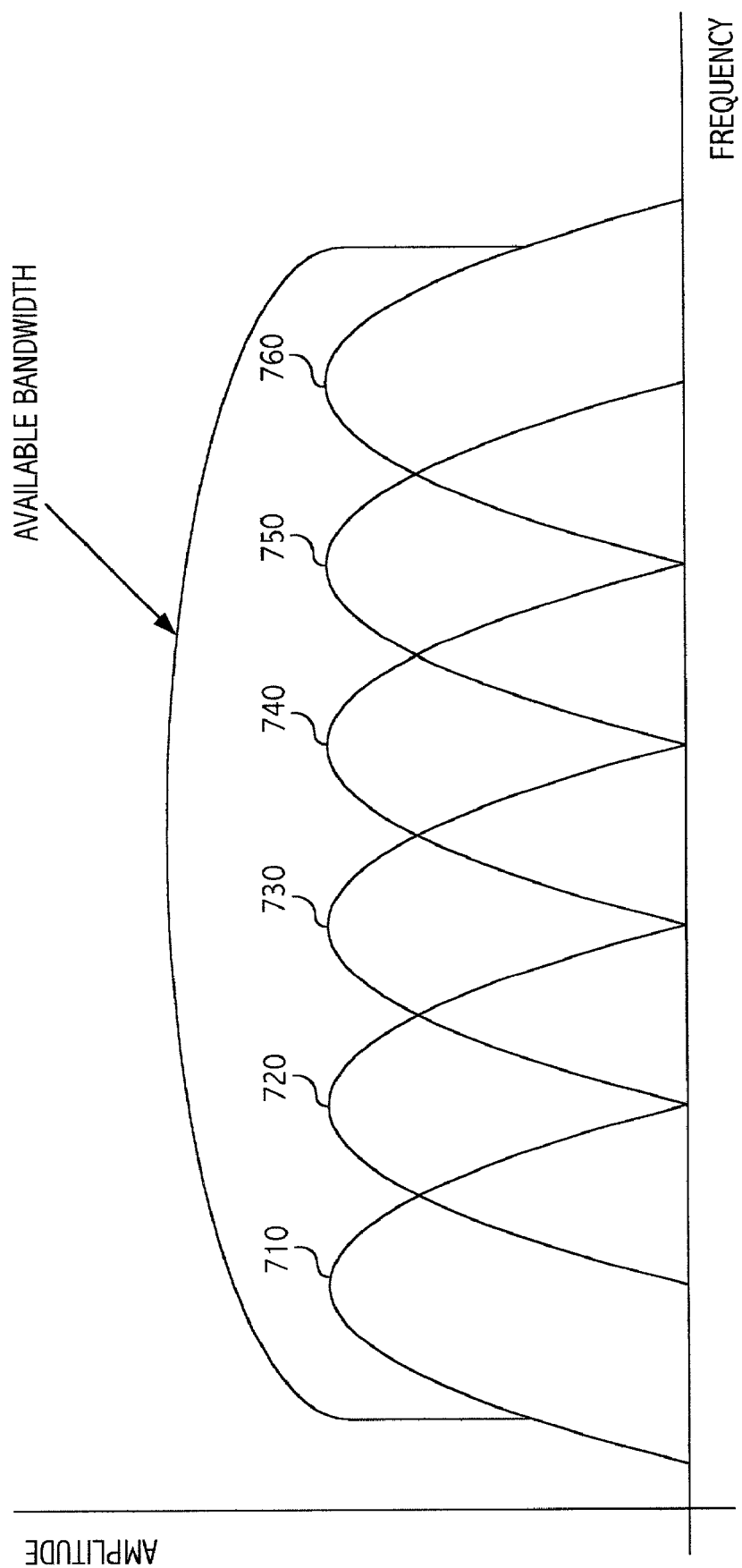
FIG. 7 shows a frequency spectrum of orthogonal frequency division multiplexing (OFDM) sub-carrier signals.

FIG. 7 shows a frequency spectrum of orthogonal frequency division multiplexing (OFDM) sub-carrier signals. Frequency division multiplexing systems include dividing the available frequency bandwidth into multiple data carriers. OFDM systems include multiple carriers (or tones) that divide transmitted data across the available frequency spectrum. In OFDM systems, each tone is considered to be orthogonal (independent or unrelated) to the adjacent tones. OFDM systems use bursts of data, each burst of a duration of time that is much greater than the delay spread to minimize the effect of ISI caused by delay spread. Data is transmitted in bursts, and each burst consists of a cyclic prefix followed by data symbols, and/or data symbols followed by a cyclic suffix.

FIG. 7 shows a frequency spectrum of OFDM sub-carrier signals 710, 720, 730, 740, 750, 760. Each sub-carrier 710, 720, 730, 740, 750, 760 is modulated by a separate linear combination of incoming symbols.

An example OFDM signal occupying 6 MHz is made up of 1024 individual carriers (or tones), each carrying a single QAM symbol per burst. A cyclic prefix or cyclic suffix is used to absorb transients from previous bursts caused by multipath signals. Additionally, the cyclic prefix or cyclic suffix causes the symbol stream to look periodic. Additional symbols (for example 100) are transmitted for the cyclic prefix or cyclic suffix. For each symbol period a total of 1124 symbols are transmitted, by only 1024 unique QAM symbols per burst. In general, by the time the cyclic prefix is over, the resulting waveform created by the combining multipath signals is not a function of any samples from the previous burst. Therefore, no ISI occurs. The cyclic prefix must be greater than the delay spread of the multipath signals.

Figure 8:
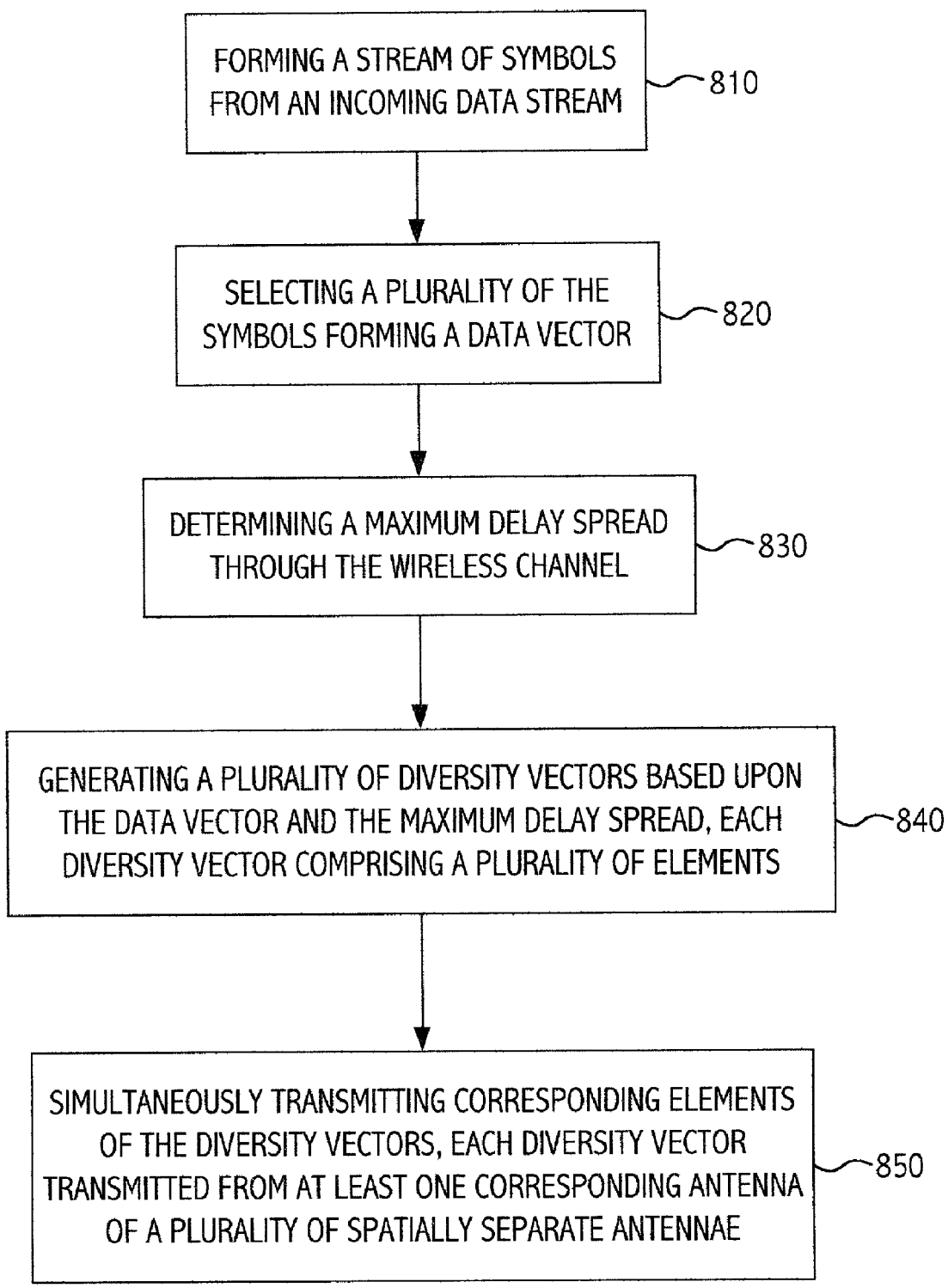
FIG. 8 is a flow chart showing steps included within an embodiment of a transmitter according to the invention.

FIG. 8 is a flow chart showing steps included within an embodiment of a transmitter according to the invention. A first step 810 includes forming a stream of symbols from an incoming data stream. A second step 820 includes selecting a plurality of symbols forming a data vector. A third step 830 includes determining a maximum delay spread through the wireless channel. A fourth step 840 includes generating a plurality of diversity vectors based upon the data vector and the maximum delay spread, each diversity vector including a plurality of elements. A fifth step 850 includes simultaneously transmitting corresponding elements of the diversity vectors, each diversity vector transmitted from at least one corresponding antenna of a plurality of spatially separate antennae.

Figure 9:
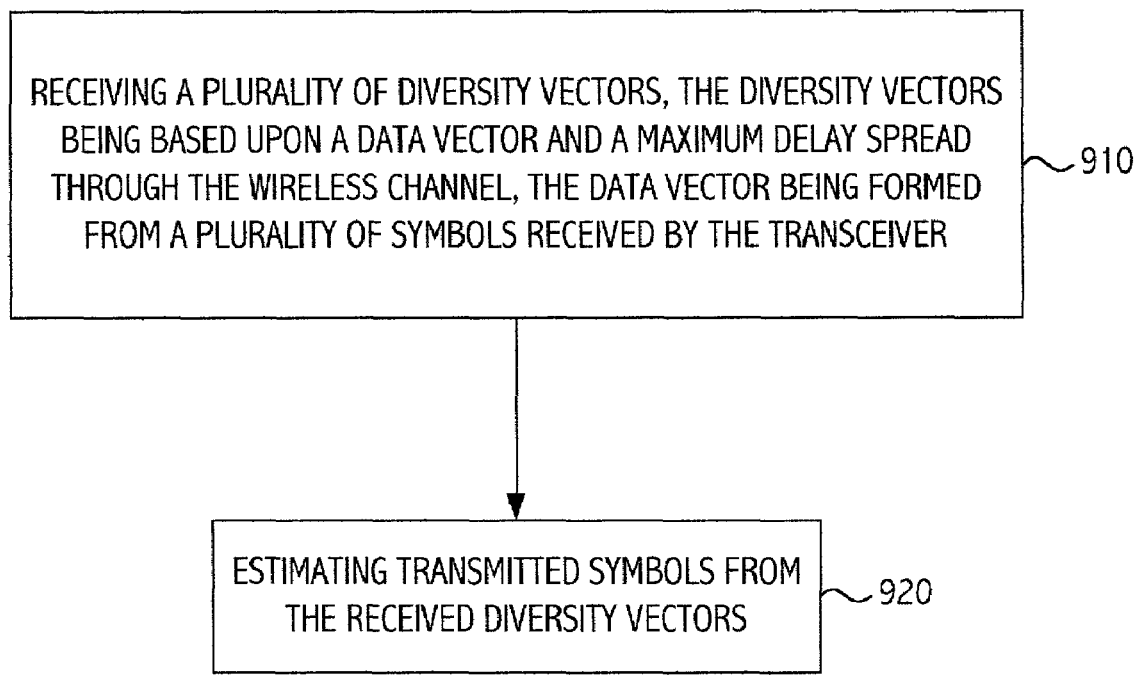
FIG. 9 is a flow chart showing steps included within an embodiment of a receiver according to the invention.

FIG. 9 is a flow chart showing steps included within an embodiment of a receiver according to the invention. A first step 910 includes receiving a plurality of diversity vectors, the diversity vectors being based upon a data vector and a maximum delay spread through the wireless channel, the data vector being formed from a plurality of symbols received by the transceiver. A second step 920 includes estimating transmitted symbols from the received diversity vectors.

Although specific embodiments of the invention have been described and illustrated, the invention is not to be limited to the specific forms or arrangements of parts so described and illustrated. The invention is limited only by the claims.

What is claimed:

1. A method of diversity transmission through a wireless channel formed between multiple transmission antennae of a transceiver and a subscriber unit comprising:
forming a stream of symbols from an incoming data stream;
selecting a plurality of the symbols to form a data vector;
determining a maximum delay spread through the wireless channel;
generating a plurality of diversity vectors based upon the data vector and the determined maximum delay spread, each diversity vector comprising a plurality of elements, and wherein a diversity vector is generated by shifting elements within the data vector by an amount that corresponds with a multiple of the determined delay spread; and
simultaneously transmitting corresponding elements of the diversity vectors, each diversity vector transmitted from at least one corresponding antenna of a plurality of spatially separate antennae.

2. The method of diversity transmission of claim 1, wherein the maximum delay spread is determined as a multiple of a sample time spacing between elements of the data vector.

3. The method of diversity transmission of claim 1, wherein the multiple of the maximum delay spread may be a fraction.

4. The method of diversity transmission of claim 1, wherein generating a plurality of diversity vectors based upon the data vector and the maximum delay spread comprises:
generating each diversity vector by shifting elements within the data vector by an amount that corresponds with a multiple of a delay greater than the maximum delay spread.

5. The method of diversity transmission of claim 1, wherein generating a plurality of diversity vectors based upon the data vector and the maximum delay spread comprises:
generating an Mth diversity vector by shifting elements within the data vector by (M−1)*L, where L is the maximum delay spread normalized by a sample time spacing between elements of the data vector.

6. The method of diversity transmission of claim 4, wherein the Mth diversity vector is transmitted from an Mth transmission antenna.

7. The method of diversity transmission of claim 4, wherein the diversity vectors are formed from the data vector by circularly shifting the elements of the data vector.

8. The method of diversity transmission of claim 7, wherein a cyclic prefix is appended to each of the diversity vectors.

9. The method of diversity transmission of claim 1, further comprising:
repeatedly simultaneously transmitting corresponding elements of the diversity vectors until all elements of the diversity vectors have been transmitted, each diversity vector transmitted from at least one corresponding antenna of a plurality of spatially separate antenna.

10. The method of diversity transmission of claim 1, wherein simultaneously transmitting corresponding elements of the diversity vectors comprises simultaneously transmitting all the elements of the diversity vectors, each element transmitted within a corresponding frequency slot.

11. The method of diversity transmission of claim 10, wherein each frequency slot comprises at least one multiple carrier signal.

12. The method of diversity transmission of claim 11, wherein the multiple carrier signals are orthogonal frequency division mutiplexed (OFDM) signals.

13. The method of diversity transmission of claim 1, further comprising setting a number $M_t$ of transmission antennae.

14. The method of diversity transmission of claim 1, wherein the plurality of selected inputs symbols includes at least $M_t$*L symbols, where L is the maximum delay spread normalized by a sample time spacing between elements of the data vector, and the transmitter comprises $M_t$ spatially separate transmit antennae.

15. The method of diversity transmission of claim 14, wherein the plurality of selected input symbols is a power of two.

16. The method of diversity transmission of claim 1, wherein the spatially separate antennae are co-located at a single base transceiver station.

17. The method of diversity transmission of claim 1, wherein the spatially separate antennae are located at a plurality of base transceiver stations.

18. The method of diversity transmission of claim 7, wherein generating a plurality of diversity vectors by circularly rotating the transmit vector comprises;
    shifting transmit vector elements within transmit vector to form each diversity vector.

19. The method of diversity transmission of claim 7, wherein generating a plurality of diversity vectors by circularly rotating the transmit vector comprises;
    reversing the order of the elements within the transmit vector; and
    shifting the transmit vector elements within the reversed transmit vector to form each diversity vector.

20. The method of diversity transmission of claim 1, wherein a number of diversity vectors formed is equal to a number $M_t$ of transmit vector elements.

21. The method of diversity transmission of claim 1, wherein a number of diversity vectors formed is less than a number $M_t$ of transmit vector elements.

22. The method of diversity transmission of claim 1, wherein the maximum delay spread is determined by characterizing the wireless channel.

23. The method of diversity transmission of claim 1, wherein the maximum delay spread is determined by the subscriber unit receiving and characterizing transmitted signals and feeding the maximum delay spread back to the transceiver.

24. The method of diversity transmission of claim 1, wherein the maximum delay spread is determined by the transceiver receiving and characterizing signals received from the subscriber unit.

25. A diversity transmitter for providing transmission through a wireless channel formed between multiple transmission antennae of a transceiver and a subscriber unit, the diversity transmitter comprising:
    an encoder that receives and encodes a bit stream;
    a mapper that maps the encoded bit stream into symbols;
    a block former for selecting blocks of the symbols;
    means for determining a maximum delay spread through the wireless channel;
    means for generating a plurality of diversity vectors based upon the data vector and the maximum delay spread, each diversity vector comprising a plurality of elements, and wherein a diversity vector is generated by shifting elements within the data vector by an amount that corresponds with a multiple of the determined delay spread wherein the multiple; and
    a plurality of transmit antenna for transmitting the diversity vectors.

26. The diversity transmitter of claim 25, wherein corresponding elements of the transmit vectors are simultaneously transmitted.

27. The diversity transmitter of claim 25, wherein all elements of the transmit vectors are simultaneously transmitted within a corresponding frequency slot.

28. A diversity transmitter comprising:
    an encoder to receive and selectively encode a bit stream;
    a mapper, responsive to the encoder, to map the encoded bit stream into symbols;
    a block former, responsive to the mapper, to select blocks of the symbols;
    a delay spread generator, to determine a maximum delay spread through the wireless channel; and
    a vector generator, responsive to the delay spread generator and the block former, to generate a plurality of diversity vectors based, at least in part, upon a data vector comprising one or more of the symbol blocks and an indication of the maximum delay spread by shifting elements within the data vector by an amount that corresponds with some multiple of the maximum delay spread for selective transmission through one or more of a plurality of spatially separate antenna(e).

* * * * *